United States Patent [19]

Peterson

[11] Patent Number: 5,755,079
[45] Date of Patent: May 26, 1998

[54] COMPOSITE PACKAGE STRUCTURE FOR CONTAINING ARTICLES AND METHOD FOR PRODUCING THEREOF

[75] Inventor: Ralph Scott Peterson, Clifton Forge, Va.

[73] Assignee: Westvaco Corporation, New York, N.Y.

[21] Appl. No.: 764,387

[22] Filed: Dec. 13, 1996

Related U.S. Application Data

[62] Division of Ser. No. 401,143, Mar. 8, 1995, abandoned.

[51] Int. Cl.⁶ ..................................................... B65B 47/00
[52] U.S. Cl. ........................... 53/453; 53/415; 53/449
[58] Field of Search .......................... 156/69; 53/135.2, 53/559, 329.2, 329.3, 329.5, 415, 449, 453, 478

[56] References Cited

U.S. PATENT DOCUMENTS

| | | |
|---|---|---|
| 3,255,880 | 6/1966 | Grossman . |
| 3,463,307 | 8/1969 | Caplan . |
| 3,659,706 | 5/1972 | Serrell . |
| 4,635,797 | 1/1987 | Bankier . |
| 4,724,957 | 2/1988 | Burgschweiger . |
| 4,771,886 | 9/1988 | Johnson . |
| 4,784,264 | 11/1988 | Sykes . |
| 4,793,477 | 12/1988 | Manning et al. . |
| 4,966,283 | 10/1990 | Sykes et al. . |
| 4,977,483 | 12/1990 | Perretta . |
| 5,121,834 | 6/1992 | Tissembaum . |
| 5,145,068 | 9/1992 | Schmitz et al. . |
| 5,351,823 | 10/1994 | Kollinek . |
| 5,353,932 | 10/1994 | Kollinek . |

Primary Examiner—Daniel Moon
Attorney, Agent, or Firm—J. R. McDaniel; R. L. Schmalz

[57] ABSTRACT

This invention relates to making paperboard and plastic composite package structures that combine an intricate thermoformed shell with a paperboard base or cover. Such structures of this type, generally, provide a lightweight package with a good printing surface on the outside of the package.

11 Claims, 3 Drawing Sheets

5,755,079

COMPOSITE PACKAGE STRUCTURE FOR CONTAINING ARTICLES AND METHOD FOR PRODUCING THEREOF

This application is a division of application Ser. No. 08/401,143, filed Mar. 8, 1995, now abandoned.

BACKGROUND OF THE INVENTION

1. Field of the Invention

This invention relates to paperboard and plastic composite package structures that combine an intricate thermoformed shell with a paperboard base or cover. Such structures of this type, generally, provide a lightweight package with a good printing surface on the outside of the package.

2. Description of the Related Art

It is known, in composite package structures, to make use of a book-like container paperboard cover and a plastic inner tray. Exemplary of such structures is U.S. Pat. No. 4,724,957 ('957), to O. Burgschweiger, entitled "Container." While the 1957 patent teaches a paperboard cover and a plastic inner tray, the cover is not connected to the inner tray along the spine. Also, foil is located on the exterior side of the cover. It is apparent, that if the inner tray were bonded to the paperboard cover along the length of the spine, greater package rigidity would result. Also, if the foil cover were eliminated, a wider range of printed graphics could be used. Consequently, a more advantageous container, then, would be presented if the rigidity and range of printed graphics were increased.

It is also known, in composite packages, to make use of an inner molded tray and an outer cover. Exemplary of such prior art is U.S. Pat. No. 4,635,797 ('797) to J. D. Bankier, entitled "Pilfer Resistant Software Package". While the '797 patent teaches the use of a composite paperboard and plastic package, the plastic inner tray is welded to the paperboard cover by conventional RF techniques along the peripheral flange. The use of the high temperature RF techniques may cause temperature deformation of the thermoformable inner tray. Consequently, a still further advantageous composite package, then, would be presented if a low temperature, heat sealable coating were used.

It is apparent from the above that there exists a need in the art for a composite package which is rigid and which is capable of employing a wide range of printed graphics, but which at the same time avoids the use of high temperatures. It is a purpose of this invention to fulfill this and other needs in the art in a manner more apparent to the skilled artisan once given the following disclosure.

SUMMARY OF THE INVENTION

Generally speaking, this invention fulfills these needs by providing a composite package for containing articles, comprising a paperboard base having a first and second sides, a layer of particulate minerals located exterior to said first side of said paperboard base, a layer of a low temperature, heat sealable polymeric material located exterior to said second side of said paperboard base, and a thermoformable polymeric shell having first and second sides such that said first side of said shell is rigidly attached to said heat sealable polymeric material and articles are located substantially adjacent to said second side of said shell.

In certain preferred embodiments, the particulate minerals are clay. Also, the low temperature, heat sealable polymeric material is a coating of polyethylene (PE) and an ethylene-methyl acrylate copolymer (EMA). Also, the thermoformable shell is constructed of polystyrene or a similar plastic material. Finally, a paperboard lid may be used to cover an opening in the composite package.

In another further preferred embodiment, the composite package structure provides a lightweight package with a good printing surface on the outside of the package.

The preferred composite package, according to this invention, offers the following advantages: lightness in weight; use of a wider range of printed graphics; increased rigidity; lower manufacturing temperatures; good stability; good durability; and good economy. In fact, in many of the preferred embodiments, these factors of lightness in weight, a wider range of graphics, increased rigidity, and lower temperatures are optimized to the extent that is considerably higher than heretofore achieved in prior, known composite packages.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
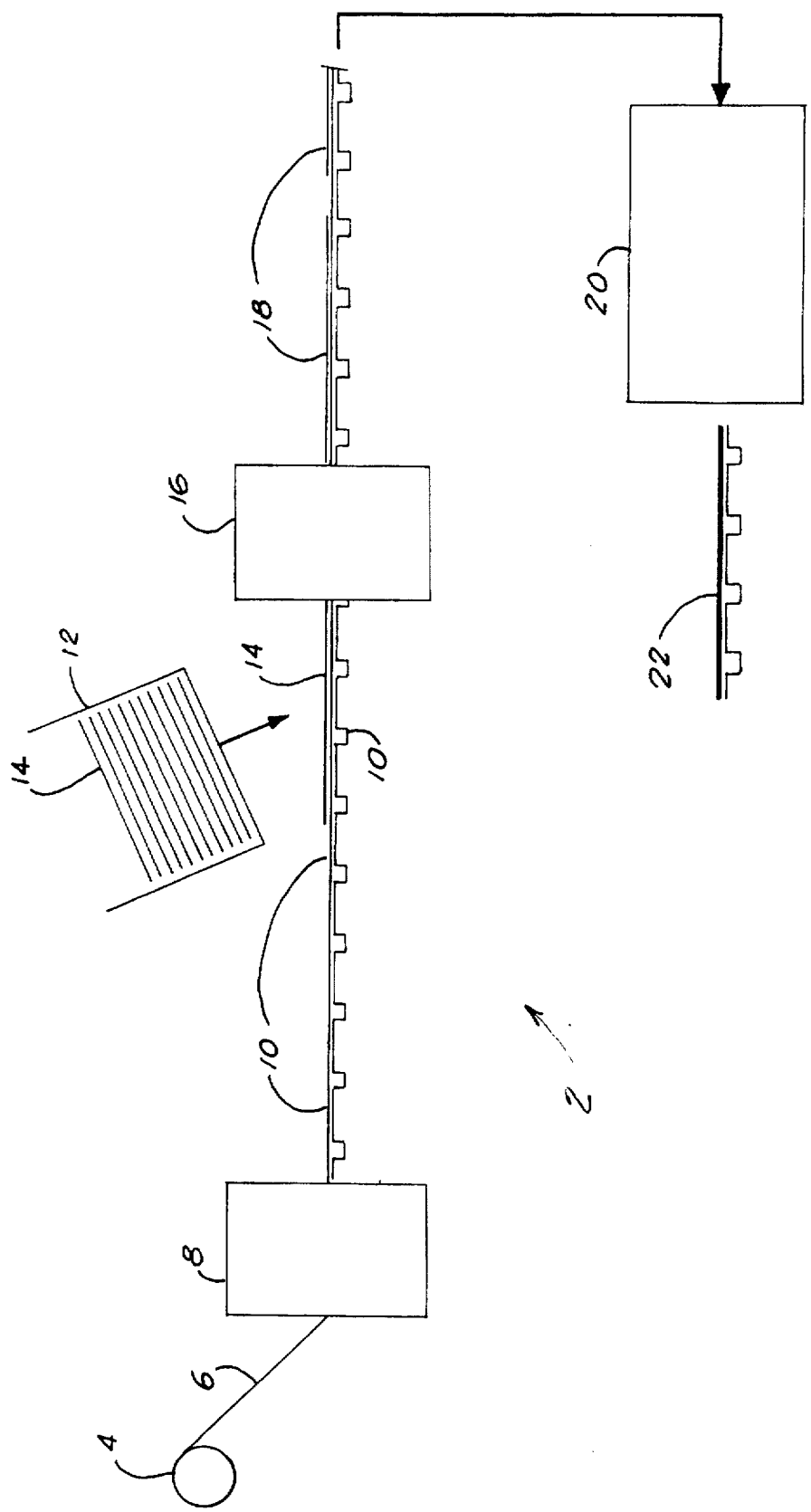
FIG. 1 is a schematic illustration of a method for producing a composite package, according to the present invention.

With reference first to FIG. 1, there is illustrated a system 2 for manufacturing a composite package 22. In particular, system 2 includes in part, thermoformable polymer roll 4, thermoformable polymer sheet 6, conventional thermoformer 8, thermoformed polymer trays 10, conventional magazine 12, paperboard bases or covers 14, conventional heat sealer 16, intermediate composite packages 18, conventional trimmer 20 and composite packages 22.

Thermoformable polymer roll 4 and sheet 6, preferably, are constructed of polystyrene or any suitable plastic material which can be thermoformed to create an inner tray shaped to match the product of interest. Paperboard bases or covers 14, preferably, include a coating 30 (FIG. 2) of particulate minerals on one side and a coating 24 (FIG. 2) of a low temperature, heat sealable polymeric material on the other side. The particulate minerals, preferably, are clay. The low temperature, heat sealable polymeric material, preferably, is a coating of polyethylene (PE) and an ethylene-methyl acrylate copolymer (EMA) having an initiation temperature of below 140° F. and a Vicat softening point of below 130° F. It is to be understood that coating 24 can be applied to base or cover 14 by conventional techniques, such as, coextrusion.

During the construction of composite packages 22, roll 4 is unrolled such that sheet 6 is formed. Sheet 6 is transferred through thermoformer 8 such that a web of trays 10 is produced. After the web of trays 10 is produced, a paperboard base or cover 14 is placed upon one side of trays 10 such that coating 24 (FIG. 2) is adjacent to tray 10. After the paperboard base or cover 14 is placed upon tray 10, tray 10 and base or cover 14 are heat sealed in heat sealer 16 such that an intermediate package 18 is produced. Intermediate package 18 is then transferred to trimmer 20 such that composite package 22 is formed.

Figure 2:
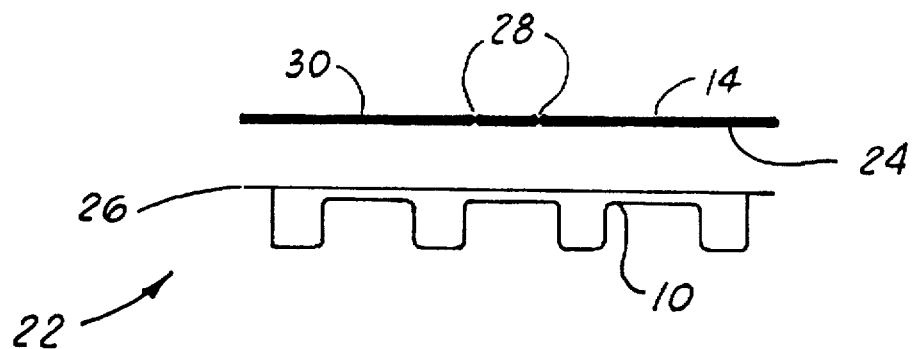
FIG. 2 is a side, exploded view the composite package, according to the present invention.

With respect to FIG. 2, FIG. 2 illustrates, in more detail, the final construction of composite package 22. In particular, composite package 22 includes, in part, thermoformed polymer tray 10, paperboard base or cover 14, low temperature, heat sealable coating 24, flange 26, score lines 28 and particulate coating 30. Coating 24, preferably, is the same low temperature, heat sealable coating 24, as described above. Also, coating 30 is the same coating 30, as described above. Finally, score lines 28 are placed on paperboard base or cover 14 in order to provide a desired flexibility within paperboard base or cover 14. It is to understood, however, that score lines 28 may be omitted in certain instances.

In order to secure articles within package 22, package 22 is oriented such that the articles are placed in one section of tray 10. The other section of tray 10 is then folded over in a book-like manner, along score lines 28 and coupled with the section of tray 10 holding the articles. In this manner, the articles are retained within tray 10 and package 22. Also, the end user is free to place printed graphics on base or cover 14.

Figure 3:
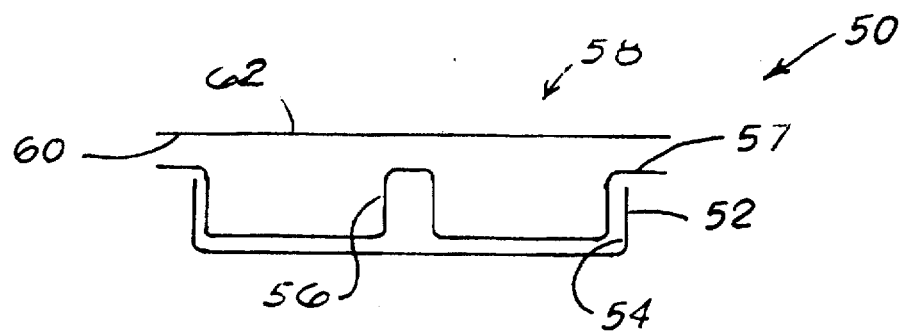
FIG. 3 is a side view of another embodiment of the composite package, according to the present invention.

FIG. 3 illustrates another embodiment of a composite package 50. In particular, composite package 50 includes, in part, paperboard base or cover 52, low temperature, heat sealable coating 54, thermoformed polymer tray 56, flange 57, paperboard lid 58, low temperature, heat seal coating 60 and particulate coating 62.

It is to be understood that coatings 54 and 60, preferably, are constructed of the same materials as coating 24 (FIG. 2). Also, coating 62, preferably, is constructed of the same materials as coating 30 (FIG. 2).

Composite package 50 is constructed in substantially the same manner as composite package 22. In particular, tray 56 is thermoformed in thermoformer 8 (FIG. 1). Paperboard base or cover 52 is then placed over tray 56 and heat sealed to tray 56 by heat sealer 16 (FIG. 1). After tray 56 is heat sealed to base or cover 52, the intermediate packages are then trimmed in trimmer 20 (FIG. 1). After the trimming is done, an article (not shown) is placed within tray 56 such as, food, and lid 58 is then heat sealed to flanges 57 such that composite package 50 is formed.

Figure 4:
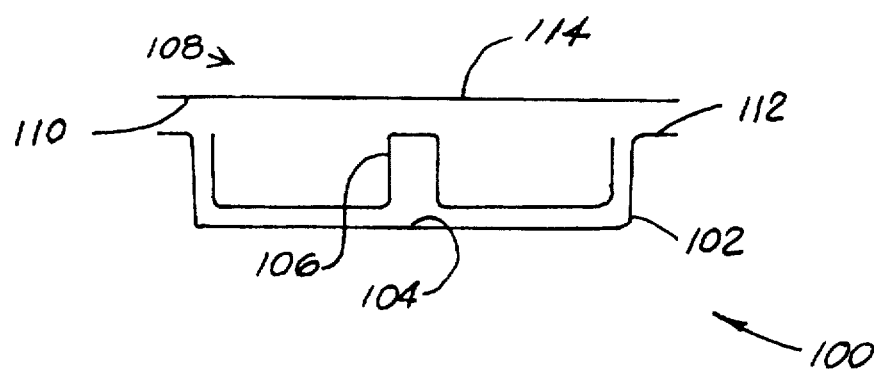
FIG. 4 is a side view of still another embodiment of the composite package, according to the present invention.

FIG. 4 shows still another embodiment of a composite package 100. Composite package 100 includes in part, paperboard base or cover 102, low temperature, heat sealable coating 104, thermoformed polymer tray 106, paperboard cover 108, low temperature, heat sealable coating 110, and flanges 112, and particulate coating 114. Coating 104, preferably, is the same as coating 24 in FIG. 2. Coating 110, preferably, is any suitable heat sealable coating which will adequately bond to paperboard flanges 112. Finally, coating 114, preferably, is constructed of the same materials as coating 30 (FIG. 2).

The construction of composite package 100 is substantially similar to the construction of composite package 50. In particular, tray 106 is thermoformed. Base or cover 102 is then heat sealed to tray 106. Articles are placed within tray 106. Finally, lid 108 is then heat sealed to flanges 112.

Figure 5:
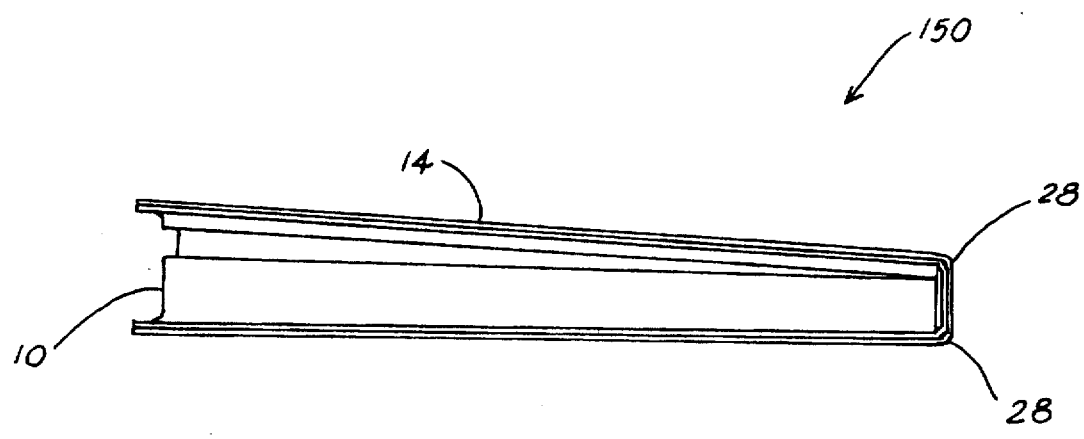
FIG. 5 is a side view of the constructed composite package of FIG. 2 and folded, according to the present invention.

Finally, FIG. 5 shows composite package 22 in a folded form. In particular, package 22 is folded along score lines 28 such that mating sections of polymer tray 10 mate with each other in order to retain articles (not shown) within package 22 after package 22 is folded over.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for producing a composite package for containing articles, wherein said method is comprised of the steps of:

forming a sheet of polymeric material into a web of a plurality of polymeric trays;

coating a first side of a paperboard cover means with a coating of a low temperature, heat sealable coating;

placing said coated paperboard cover means substantially over one of said plurality of polymeric trays with said coating located adjacent to said one of said trays;

securing said one of said plurality of polymeric trays to said coated paperboard cover means at an initiation temperature of less than 200° F. to form an intermediate composite package;

trimming said intermediate composite package to form a final matched-edge composite package;

inserting an article substantially within said final composite package; and retaining said article substantially within said final composite package.

2. The method, as in claim 1, wherein said forming step is further comprised of the step of:

thermoforming said sheet of polymeric material.

3. The method, as in claim 1, wherein said polymeric material is further comprised of:

polystyrene.

4. The method, as in claim 1, wherein said heat sealable coating is further comprised of:

a coextrusion of polyethylene and an ethylene-methyl acrylate copolymer.

5. The method, as in claim 1, wherein said method is further comprised of the step of:

coating a second side of said paperboard cover means with a layer of particulate minerals.

6. The method, as in claim 5, wherein said particulate minerals are further comprised of:

clay.

7. The method, as in claim 1, wherein said securing step is further comprised of the step of:

heat sealing said paperboard covers to said one of said polymeric trays.

8. The method, as in claim 1, wherein said retaining step is further comprised of the step of:

folding said final composite package.

9. The method, as in claim 1, wherein said method is further comprised of the step of:

securing a lid means having first and second sides substantially over one of said plurality of polymeric trays.

10. The method, as in claim 9, wherein said lid means is further comprised of:

a low temperature, heat sealable coating located exterior to said first side of said lid means and substantially facing one of said plurality polymeric trays.

11. The method, as claim 9, wherein said lid means is further comprised of:

a coating of particulate minerals located exterior to said second side of said lid means.

* * * * *